United States

Shoemaker

[11] 3,902,793

[45] Sept. 2, 1975

[54] FIVE MEMBER OIL IMMERSION MICROSCOPE OBJECTIVE

[75] Inventor: Arthur H. Shoemaker, East Aurora, N.Y.

[73] Assignee: American Optical Corporation, Southbridge, Mass.

[22] Filed: May 6, 1974

[21] Appl. No.: 467,437

[52] U.S. Cl. ......... 350/216; 350/175 ML; 350/176; 350/177
[51] Int. Cl.² ........................................... G02B 21/02
[58] Field of Search ..... 350/216, 175 ML, 176, 177

[56] References Cited
UNITED STATES PATENTS

| | | | |
|---|---|---|---|
| 3,355,234 | 11/1967 | Muller | 350/175 ML X |
| 3,537,772 | 11/1970 | Shoemaker | 350/175 ML X |
| 3,598,474 | 8/1971 | Shoemaker | 350/175 ML X |

*Primary Examiner*—John K. Corbin
*Attorney, Agent, or Firm*—Alan H. Spencer; William C. Nealon; H. R. Berkenstock, Jr.

[57] ABSTRACT

A five member microscope objective having a numerical aperture of substantially 1.25 and a magnification of substantially 100× provides a substantially flat image field of 24mm.

2 Claims, 1 Drawing Figure

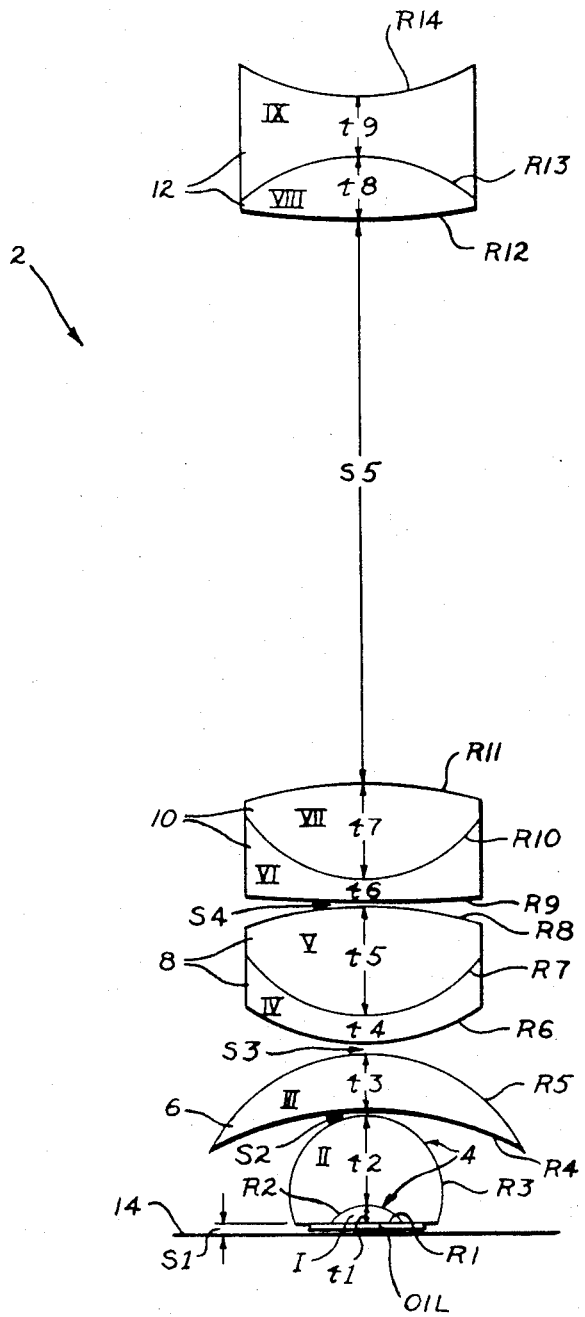

FIVE MEMBER OIL IMMERSION MICROSCOPE OBJECTIVE

BACKGROUND OF THE INVENTION

The present invention relates to a microscope objective.

An object of the present invention is to provide an achromatic oil immersion microscope objective having a numerical aperture of substantially 1.25 and a magnification of substantially 100×, in which chromatic and spherical aberrations, coma, and astigmatism are well corrected while yet providing a substantially flat image field of 24mm when used with a telescope objective as described in U.S. Pat. No. 3,355,234.

DRAWING

In the drawing, a microscope objective is represented by a plurality of lenses viewed transversely to their axis.

DESCRIPTION

Referring now to the drawing, a microscope objective is generally shown at 2. It includes a front doublet 4, a single lens 6, a doublet 8, a doublet 10, and a doublet 12, all of said lenses being in axial alignment. Objective 2 is disposed relative to an object plane 14 as shown in the drawing. A capillary oil space exists between plane 14 and doublet 4. Positive doublet 4 includes a plano-convex lens I and a concavo-convex lens II. Lens 6 is a concavo-convex positive meniscus shaped lens, also designated as III.

Doublet 8 includes a convex-concavo lens IV and a double convex lens V, together forming a positive double convex doublet. Doublet 10 includes a convex-concavo lens VI and a double convex lens VII, together forming a negative double convex doublet. Doublet 12 includes a double convex lens VIII and a double concave lens IX, together forming a negative convex-concavo doublet.

The lens parameters are as follows: The successive lens radii are designated R1–R14 where a minus sign indicates radii on centers of curvature lying on the object side of their vertices. The axial thicknesses of successive lens elements are designated T1–T9. The successive axial spaces from the object plane 14 are designated S1–S5. The refractive indices of the successive lens elements are designated ND1–ND9. The Abbe numbers of the successive lens glasses are designated $\nu 1 - \nu 9$ respectively.

The above-mentioned parameters are related to the focal length according to the following constructional data:

TABLE I

| Lens | Radius | Thickness | Space | Refractive Index | Abbe Number |
|---|---|---|---|---|---|
| | | | $S_1=0.1812F$ | | |
| I | $R_1 = \infty$ | $T_1=0.3415F$ | | $ND_1=1.51700$ | $\nu_1=64.54$ |
| | $R_2 = -0.8197F$ | | | | |
| II | | $T_2=1.5956F$ | | $ND_2=1.96028$ | $\nu_2=34.92$ |
| | $R_3 = -1.5607F$ | | | | |
| | | | $S_2=0.0109F$ | | |
| | $R_4 = -6.1503F$ | | | | |
| III | | $T_3=1.0929F$ | | $ND_3=1.78833$ | $\nu_3=50.47$ |
| | $R_5 = -3.3207F$ | | | | |
| | | | $S_3=0.1639F$ | | |
| | $R_6 = 8.6224F$ | | | | |
| IV | | $T_4=0.6557F$ | | $ND_4=1.80491$ | $\nu_4=25.42$ |
| | $R_7 = 4.5344F$ | | | | |
| V | | $T_5=2.5409F$ | | $ND_5=1.48651$ | $\nu_5=84.46$ |
| | $R_8 = -4.5344F$ | | | | |
| | | | $S_4=0.0273F$ | | |
| | $R_9 = 14.5044F$ | | | | |
| VI | | $T_6=0.6557F$ | | $ND_6=1.80491$ | $\nu_6=25.42$ |
| | $R_{10}= 3.2180F$ | | | | |
| VII | | $T_7=2.7322F$ | | $ND_7=1.48651$ | $\nu_7=84.46$ |
| | $R_{11}=-12.4426F$ | | | | |
| | | | $S_5=8.0395F$ | | |
| | $R_{12}= 30.2896F$ | | | | |
| VIII | | $T_8=1.1475F$ | | $ND_8=1.74054$ | $\nu_8=27.59$ |
| | $R_{13}= -3.2831F$ | | | | |
| IX | | $T_9=0.9836F$ | | $ND_9=1.61328$ | $\nu_9=44.28$ |
| | $R_{14}= 4.1148F$ | | | | |

The foregoing parameters of radius, thickness and space are based on the value of F. As an example, the value of F is 1.830. Given in numbers, the foregoing data is as follows:

TABLE II

| Lens | Radius | Thickness | Space |
|---|---|---|---|
| | | | $S_1=0.3316$ |
| I | $R_1 = \infty$ | $T_1=0.625$ | |
| | $R_2 = -1.500$ | | |
| II | | $T_2=2.920$ | |
| | $R_3 = -2.856$ | | |
| | | | $S_2=0.020$ |
| | $R_4 = -11.255$ | | |
| III | | $T_3=2.000$ | |
| | $R_5 = -6.077$ | | |
| | | | $S_3=0.300$ |
| | $R_6 = 15.779$ | | |
| IV | | $T_4=1.200$ | |
| | $R_7 = 8.298$ | | |
| V | | $T_5=4.650$ | |
| | $R_8 = -8.298$ | | |
| | | | $S_4=0.050$ |
| | $R_9 = 26.543$ | | |
| VI | | $T_6=1.200$ | |
| | $R_{10}= 5.889$ | | |
| VII | | $T_7=5.000$ | |
| | $R_{11}=-22.770$ | | |
| | | | $S_5=14.712$ |
| | $R_{12}= 55.430$ | | |
| VIII | | $T_8=2.100$ | |
| | $R_{13}= -6.008$ | | |

TABLE II-Continued

| Lens | Radius | Thickness | Space |
|------|--------|-----------|-------|
| IX   | $R_{14}=7.530$ | $T_9=1.800$ | |

It will be apparent that the foregoing absolute values are variable depending on the value of F. Other forms are thus possible and changes may be made in the values of the constructional data based on the relationships in the first of the above charts, without departing from the spirit of this invention.

What is claimed is:

1. An achromatic microscope objective having a predetermined magnification and a numerical aperture of substantially 1.25 for forming an image of an object plane, said image being well corrected for spherical and chromatic aberrations, coma, astigmatism and curvature of image field, said objective comprising:

a front plano-convex lens member I,
a second concavo-convex lens member II,
said front and second members forming a doublet;
a third concavo-convex lens member III
a fourth convex-concavo lens member IV;
a fifth double convex lens member V;
said fourth and fifth members forming a doublet;
a sixth convex concavo lens member VI;
a seventh double convex lens member VII;
said sixth and seventh members forming a doublet;
an eighth double convex lens member VII;
a ninth double concave lens member IX;
said eighth and ninth members forming a doublet;
all of said lens members being axially aligned; and
the parameters of lens radii (R1–R14), lens thicknesses (T1–T9), axial spaces among lens element and object plane (S1–S5), refractive indice (ND1–ND9), and Abbe numbers ($\nu 1 - \nu 9$) being determined by the following relationship:

| Lens | Radius | Thickness | Space | Refractive Index | Abbe Number |
|------|--------|-----------|-------|------------------|-------------|
|      | $R_1 = \infty$ | | $S_1=0.1812F$ | | |
| I    |        | $T_1=0.3415F$ | | $ND_1=1.51700$ | $\nu_1=64.54$ |
|      | $R_2=-0.8197F$ | | | | |
| II   |        | $T_2=1.5956F$ | | $ND_2=1.96028$ | $\nu_2=34.92$ |
|      | $R_3=-1.5607F$ | | | | |
|      | $R_4=-6.1503F$ | | $S_2=0.0109F$ | | |
| III  |        | $T_3=1.0929F$ | | $ND_3=1.78833$ | $\nu_3=50.47$ |
|      | $R_5=-3.3207F$ | | | | |
|      | $R_6=8.6224F$ | | $S_3=0.1639F$ | | |
| IV   |        | $T_4=0.6557F$ | | $ND_4=1.80491$ | $\nu_4=25.42$ |
|      | $R_7=4.5344F$ | | | | |
| V    |        | $T_5=2.5409F$ | | $ND_5=1.48651$ | $\nu_5=84.46$ |
|      | $R_8=-4.5344F$ | | | | |
|      | $R_9=14.5044F$ | | $S_4=0.0273F$ | | |
| VI   |        | $T_6=0.6557F$ | | $ND_6=1.80491$ | $\nu_6=25.42$ |
|      | $R_{10}=3.2180F$ | | | | |
| VII  |        | $T_7=2.7322F$ | | $ND_7=1.48651$ | $\nu_7=84.46$ |
|      | $R_{11}=-12.4426F$ | | | | |
|      | $R_{12}=30.2896F$ | | $S_5=8.0395F$ | | |
| VIII |        | $T_8=1.1475F$ | | $ND_8=1.74054$ | $\nu_8=27.59$ |
|      | $R_{13}=-3.2831F$ | | | | |
| IX   |        | $T_9=0.9836F$ | | $ND_9=1.61328$ | $\nu_9=44.28$ |
|      | $R_{14}=4.1148F$ | | | | | wherein scalar values are given in millimeters and F is the focal length of the objective in millimeters.

2. The objective of claim 1 wherein F is 1.830.

* * * * *